Jan. 2, 1923.
D. G. ROOS.
FUEL SYSTEM FOR INTERNAL COMBUSTION ENGINES.
FILED APR. 23, 1918.

Patented Jan. 2, 1923.

1,441,028

UNITED STATES PATENT OFFICE.

DELMAR G. ROOS, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

FUEL SYSTEM FOR INTERNAL-COMBUSTION ENGINES.

Application filed April 23, 1918. Serial No. 230,333.

*To all whom it may concern:*

Be it known that I, DELMAR G. Roos, a citizen of the United States, and a resident of Bridgeport, in the county of Fairfield and State of Connecticut, have invented an Improvement in Fuel Systems for Internal-Combustion Engines, of which the following description, in connection with the accompanying drawings, is a specification, like characters on the drawings representing like parts.

This invention relates to fuel systems for internal combustion engines, and is more especially, though not exclusively, concerned with a fuel system for the use of a plurality of fuel supplies, such as hydro-carbons of different specific gravities, provision being made for shifting from one to another, in response to and to meet the needs of the engine, in accordance with changes in running conditions and temperature.

My invention will be best understood by reference to the following description, when taken in connection with the accompanying drawings of one specific embodiment thereof while its scope will be more particularly pointed out in the appended claims.

In the drawings:

Fig. 7 is a sectional view on line 7—7 of Fig. 5;

Fig. 13 is a sectional view on line 13—13 of Fig. 9;

Fig. 17 is a detail sectional view on line 17—17 of Fig. 16; and

Figure 1:
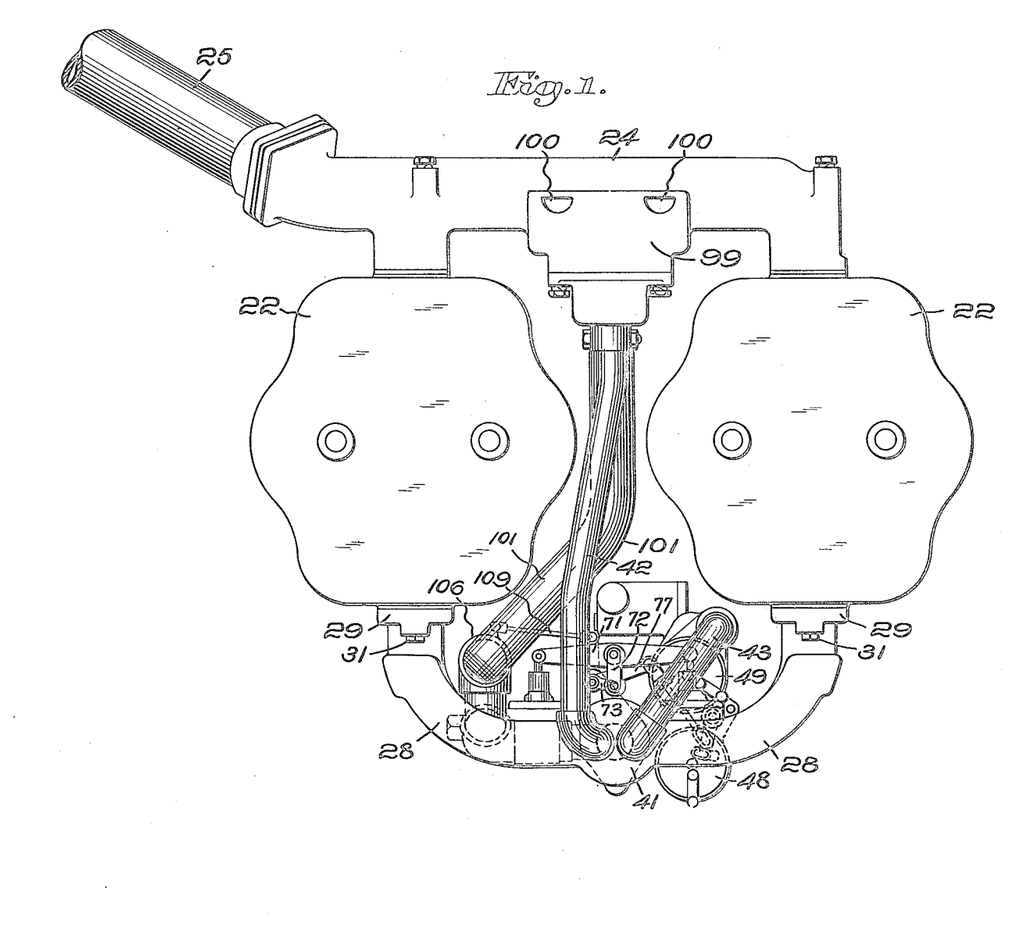
Fig. 1 is a plan of an internal combustion engine, equipped with a fuel system embodying my invention.
Figure 2:
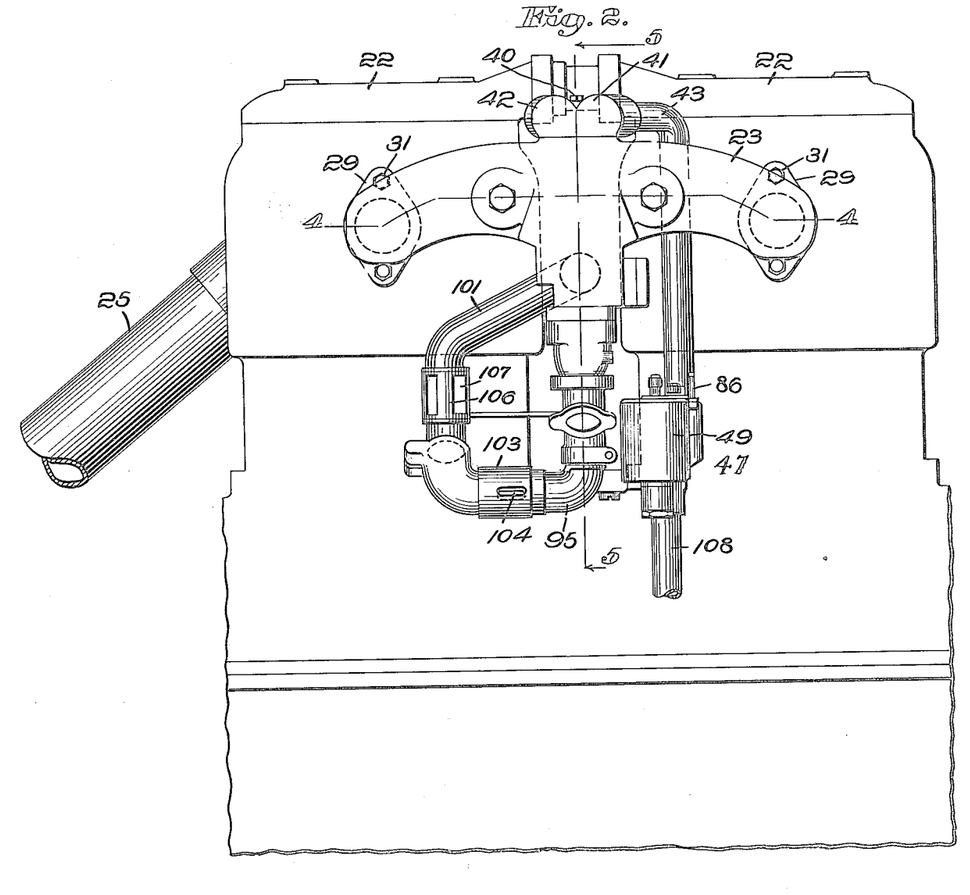
Fig. 2 is a side elevation of the parts shown in Fig. 1, as viewed from the intake side of the engine.

Referring to the drawings, and to the embodiment of my invention which is illustrated therein, I have shown (see Figs. 1 and 2) an internal combustion engine of the four-cylinder type, having its cylinders cast in pairs 22—22, and receiving their supply of combustible mixture through any appropriate intake manifold, such as a manifold 23. The exhaust gases may be carried away by an exhaust manifold 24, to which is connected an exhaust pipe 25.

Figure 4:
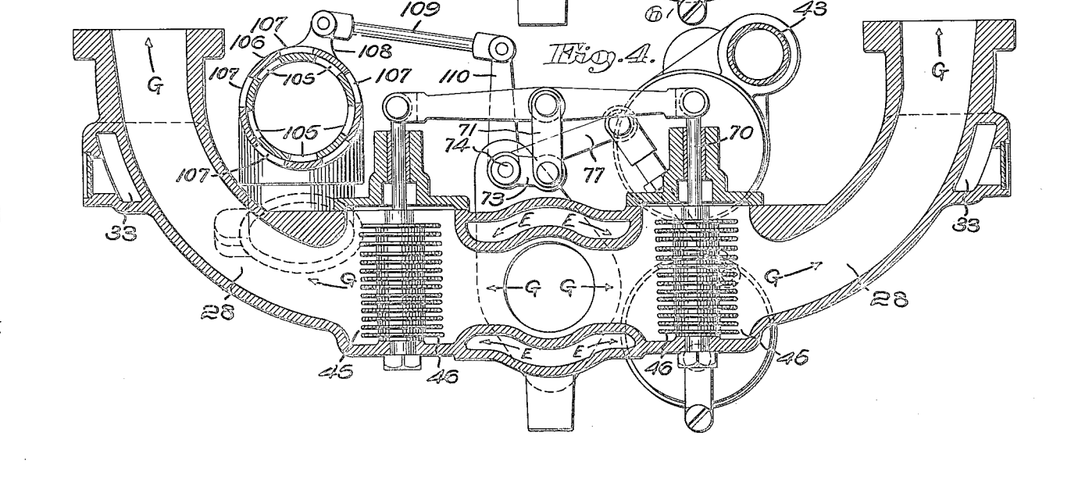
Fig. 4 is a sectional view on line 4—4 of Fig. 2, at the same scale as Fig. 3.

While the intake manifold may be of any usual or desired construction, I have herein shown a manifold which forms the subject matter of a companion application, Serial No. 221,366, filed March 9, 1918, the same being provided with a fuel-intake passage having an inlet trunk 27 and two branches 28 to conduct the vaporized fuel to the engine cylinders 22, to which the manifold may be secured in any suitable manner, as by providing the same with flanges 29 having holes 30 to receive usual studs 31. The mixture of air and fuel drawn from the carbureter hereinafter described into the inlet trunk 27 flows through the branches 28 to the engine cylinders in streams whose directions are indicated by the several arrows G in Figs. 4, 5 and 8.

In the use of the grades of gasoline now manner too well known to require further description.

Figures 9, 10:
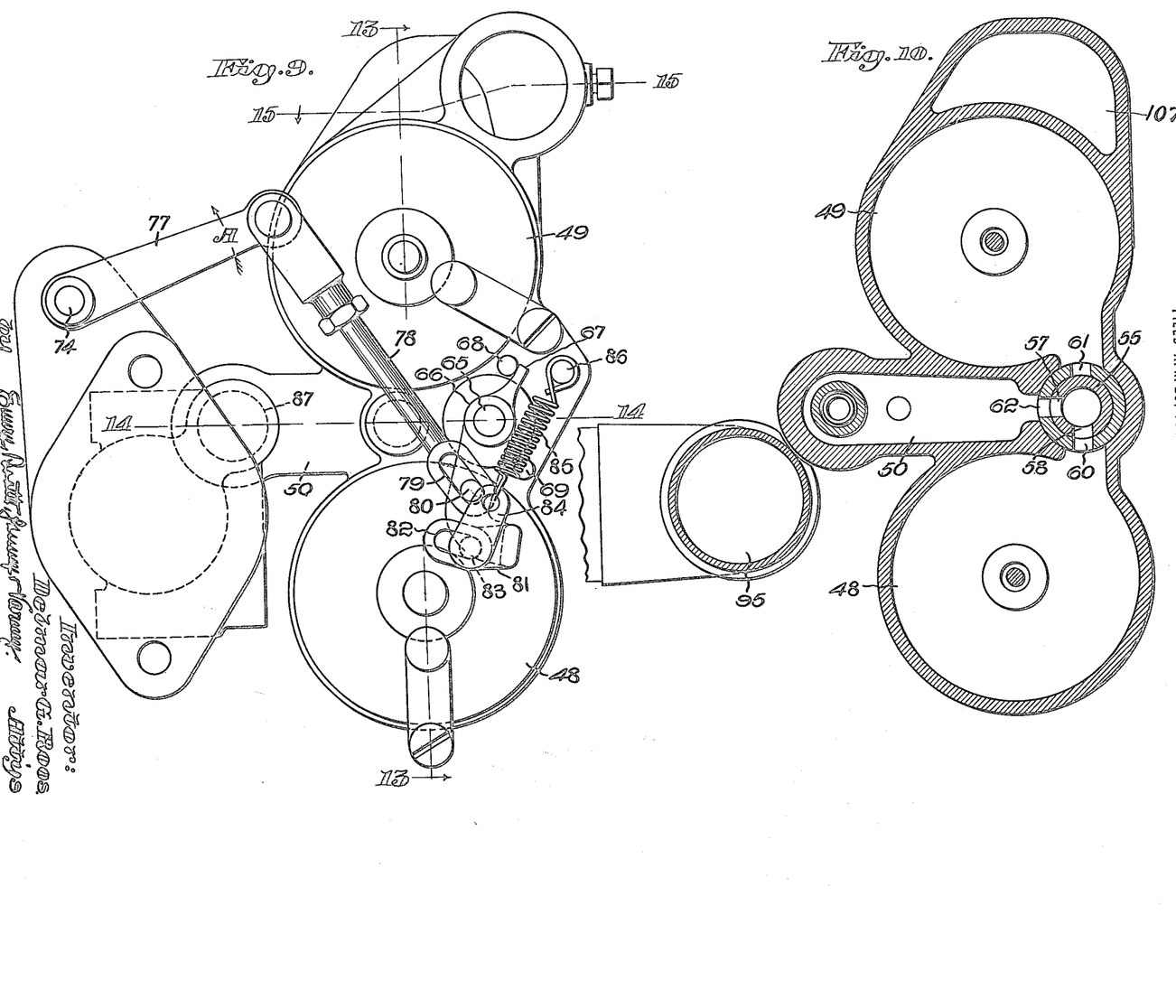
Fig. 9 is a plan of a carburetor on a much larger scale, showing the parts in the relative positions which they occupy when the fuel-controlling valve is in one of its fuel-supplying positions.
Fig. 10 is a sectional view on line 10—10 of Fig. 8, at the same scale as Fig. 9, and showing a position corresponding to the position of the parts shown in Fig. 9.
Figure 12:
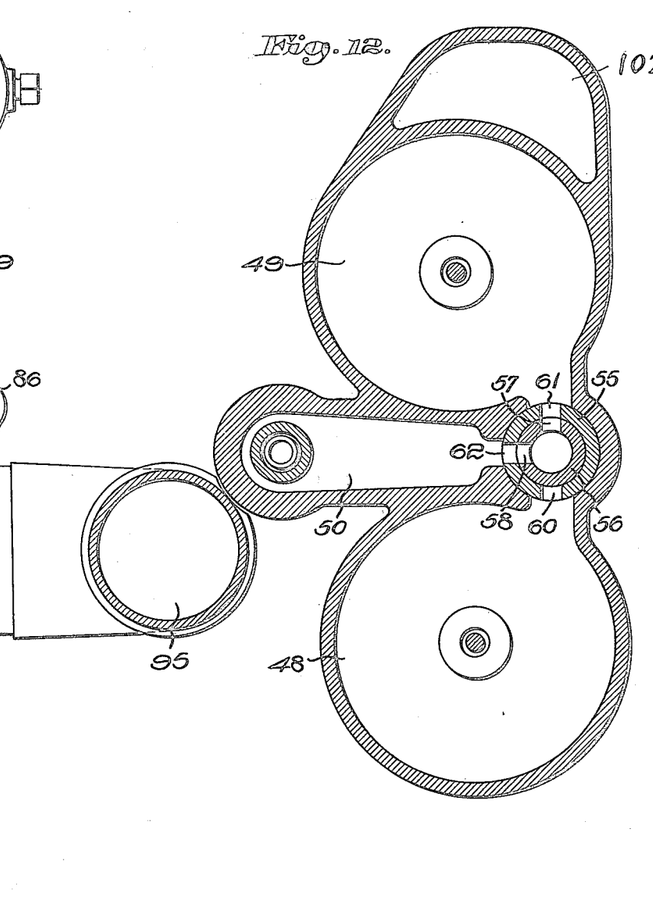
Fig. 12 is a sectional view similar to Fig. 10, showing the valve in a position corresponding to the full line position of the parts in Fig. 11.
Figure 14:
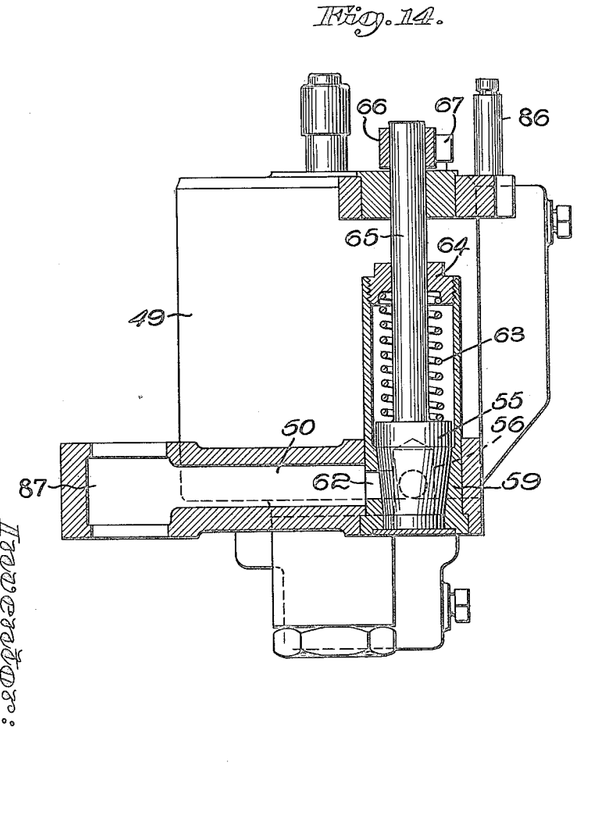
Fig. 14 is a sectional view on line 14—14 of Fig. 9.
Figure 15:
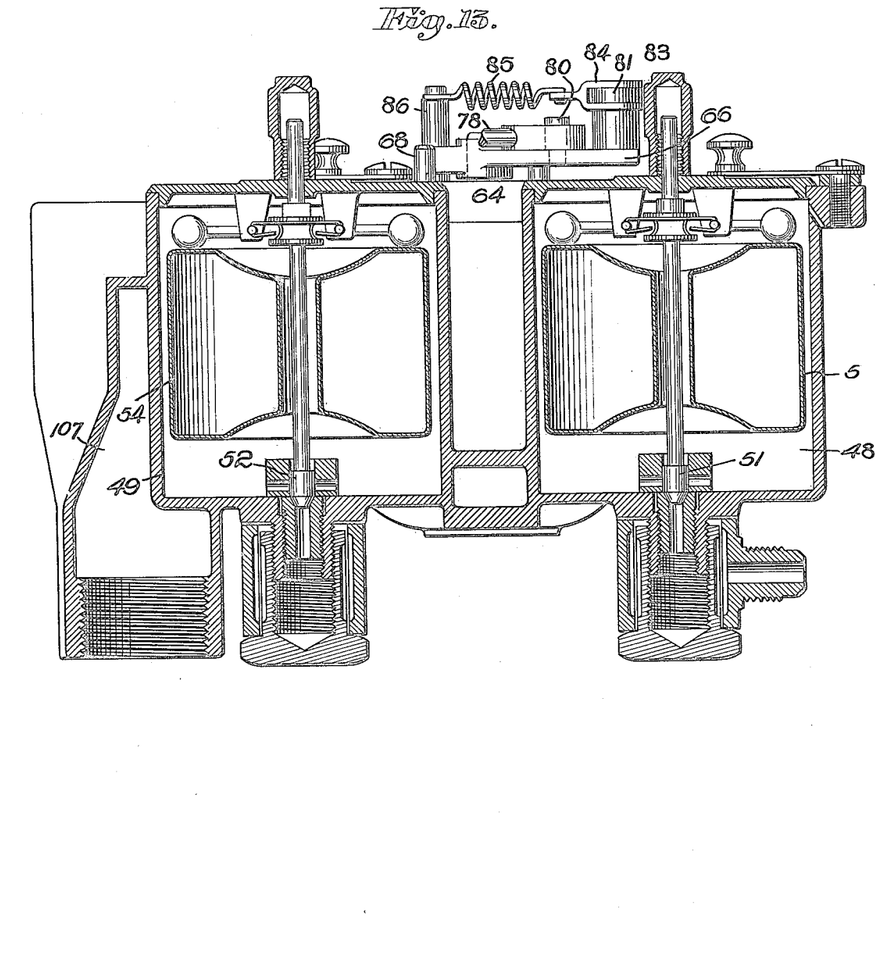
Fig. 15 is a sectional view on line 15—15 of Fig. 9.
Figure 16:
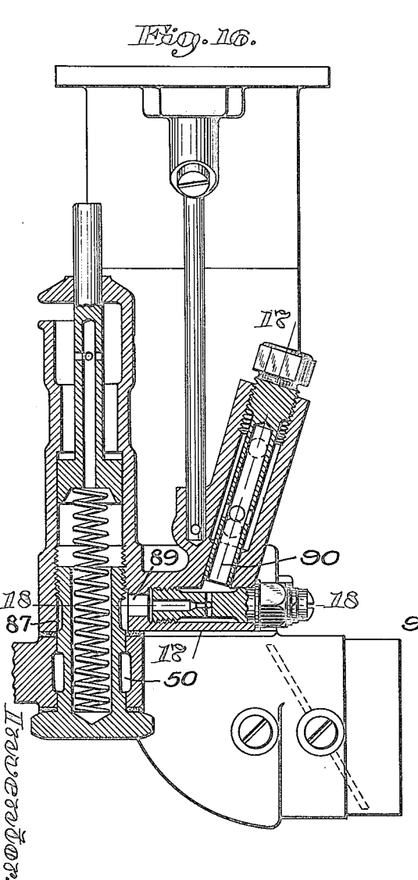
Fig. 16 is a sectional view on line 16—16 of Fig. 5.
Figure 18:
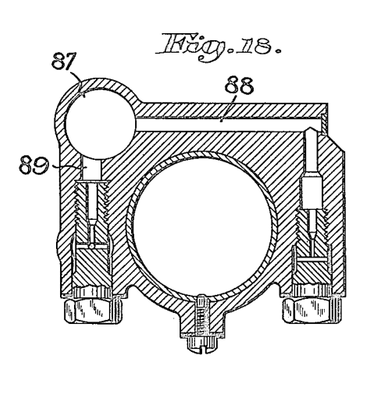
Fig. 18 is a detail sectional view on line 18—18 of Fig. 16.
Figure 19:
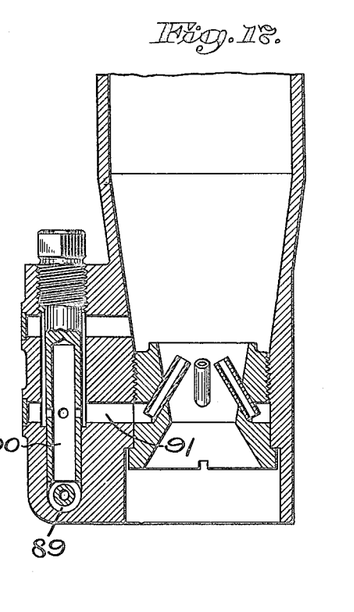

Any suitable valve means may be provided to cause the delivery of one fuel supply to the exclusion of the other from one or the other of the float chambers to the common delivery passage 50, but in the present example, I have shown a single fuel-controlling valve 55, best shown in Fig. 14, having a central chamber 56 and two ports 57 and 58 in communication therewith. The valve is herein in the form of a tapered plug, mounted in a sleeve 59 of corresponding interior shape, having ports 60, 61 and 62, communicating respectively with the chambers 48 and 49 and the passage 50, as best shown in Figs. 10 and 12. As a means for maintaining a snug working fit of the valve in the sleeve, I have herein provided a spring 63 bearing on its lower end against said valve, and at its upper end against an abutment in the form of a plug 64 threaded into the upper end of the casing 59, as best shown in Fig. 14.

Figure 11:
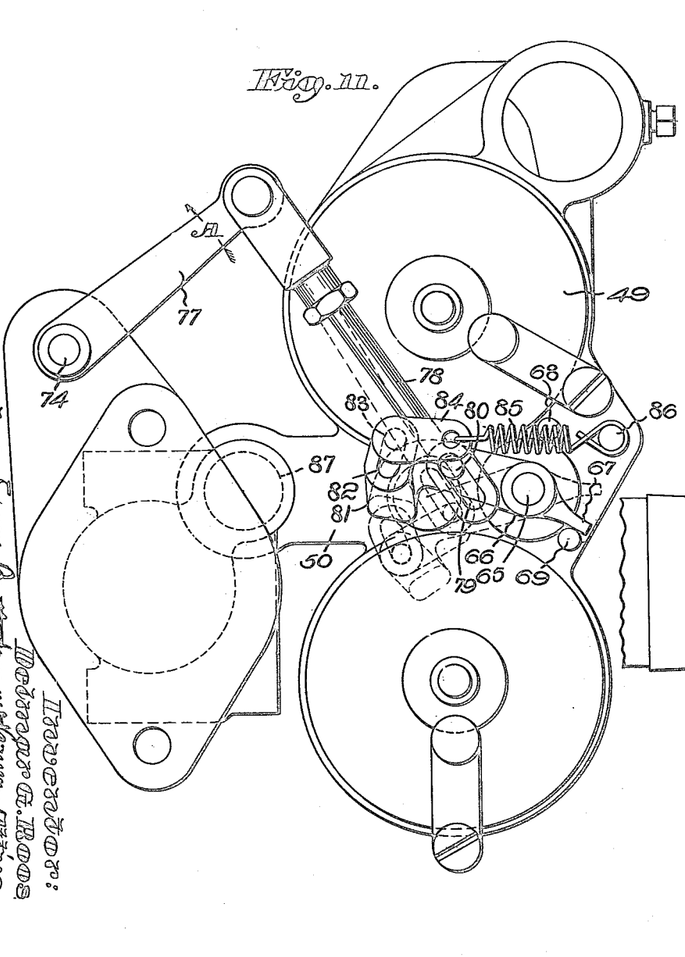
Fig. 11 is a plan of the carburetor similar to Fig. 9, showing the parts in dotted lines in a neutral or intermediate position, and in full lines in another fuel-supplying position.

Light, highly-explosive hydro-carbon may be supplied to the chamber 48, and a relatively heavier and less explosive hydro-carbon may be supplied to the chamber 49. As a means for operating the fuel-controlling valve 35 to shift from one fuel to the other, in response to and to meet the changes in the running conditions and temperature of the engine, I have herein provided novel valve-actuating mechanism connecting said valve to the thermostats 46, to which reference has already been made. The valve 55 is herein provided with a stem 65, to which is secured a lever 66, the latter having an arm 67 best shown in Figs. 9 and 11, cooperating with stops 68 and 69 to limit the turning movement of said valve. When the arm 67 is against the stop 68, as shown in Fig. 9, the valve 55 is in a position shown in Fig. 10, and the ports 57 and 58 in the valve register, respectively, with the ports 62 and 60, as shown in Fig. 10. When, however, the arm 67 is in contact with the stop 69, as shown in Fig. 11, the valve 55 occupies the position shown in Fig. 12, and the ports 57 and 58 in the valve register respectively with the ports 61 and 62. When, therefore, the valve is in the position shown in Fig. 10, the lighter hydro-carbon is supplied to the passage 50, while, on the other hand, when the valve is in the position shown in Fig. 12, the heavier hydro-carbon is supplied to said passage.

Figure 3:
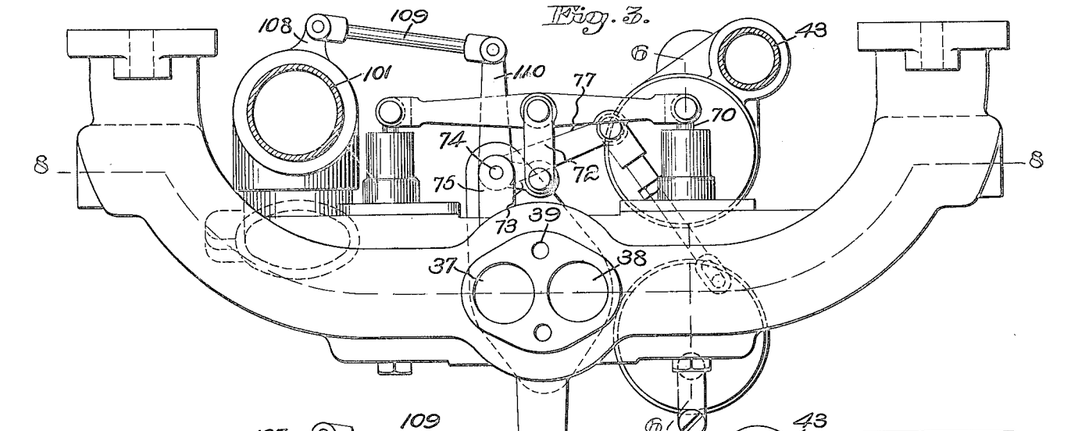
Fig. 3 is a plan on an enlarged scale, illustrating the intake manifold, carburetor, thermostats, and connections between the thermostats and carburetor.
Figures 5, 6, 8:
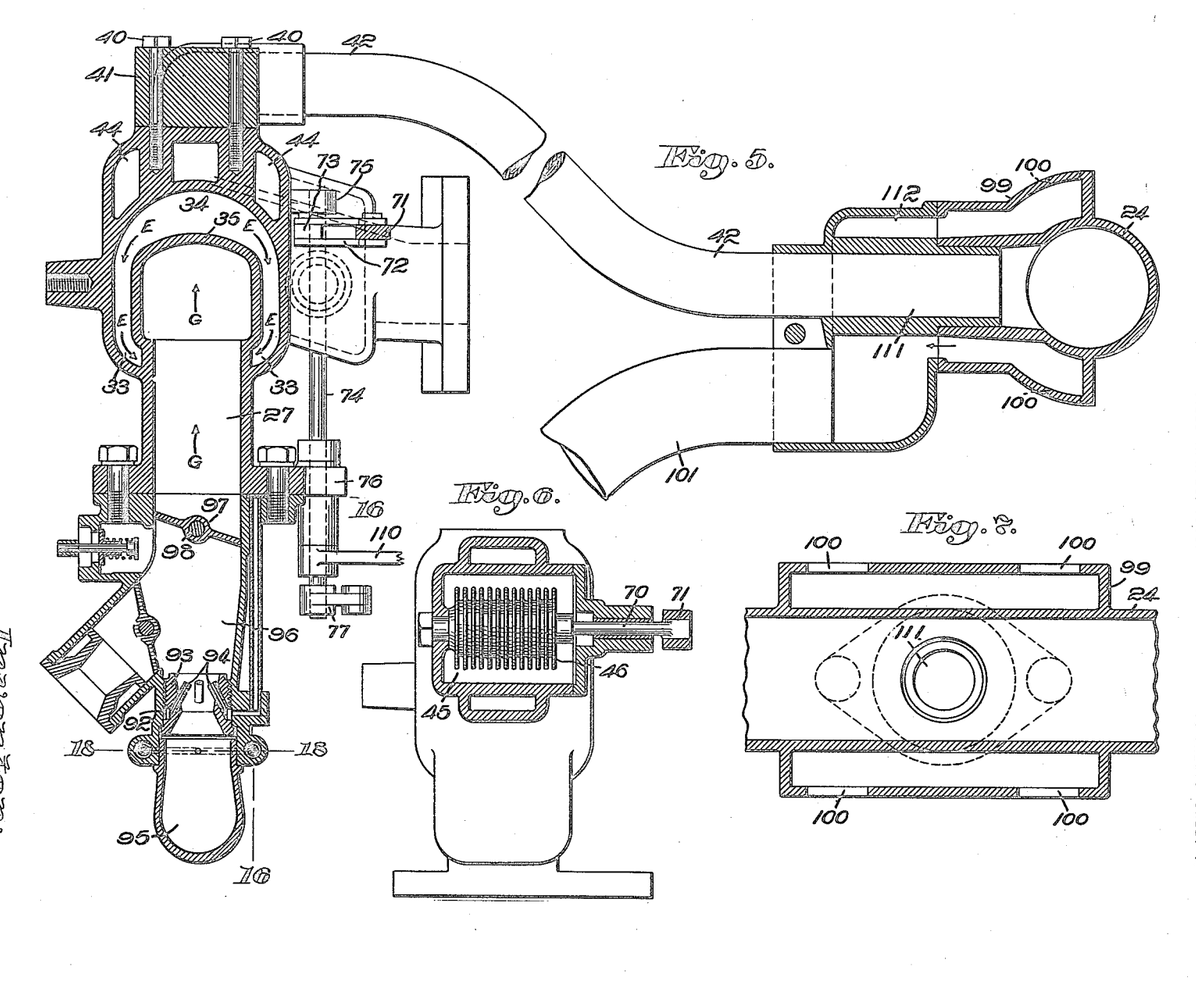
Fig. 5 is a sectional view on line 5—5 of Fig. 2.
Fig. 6 is a sectional view on line 6—6 of Fig. 3.
Fig. 8 is a sectional view on line 8—8 of Fig. 3.
Figure 8:
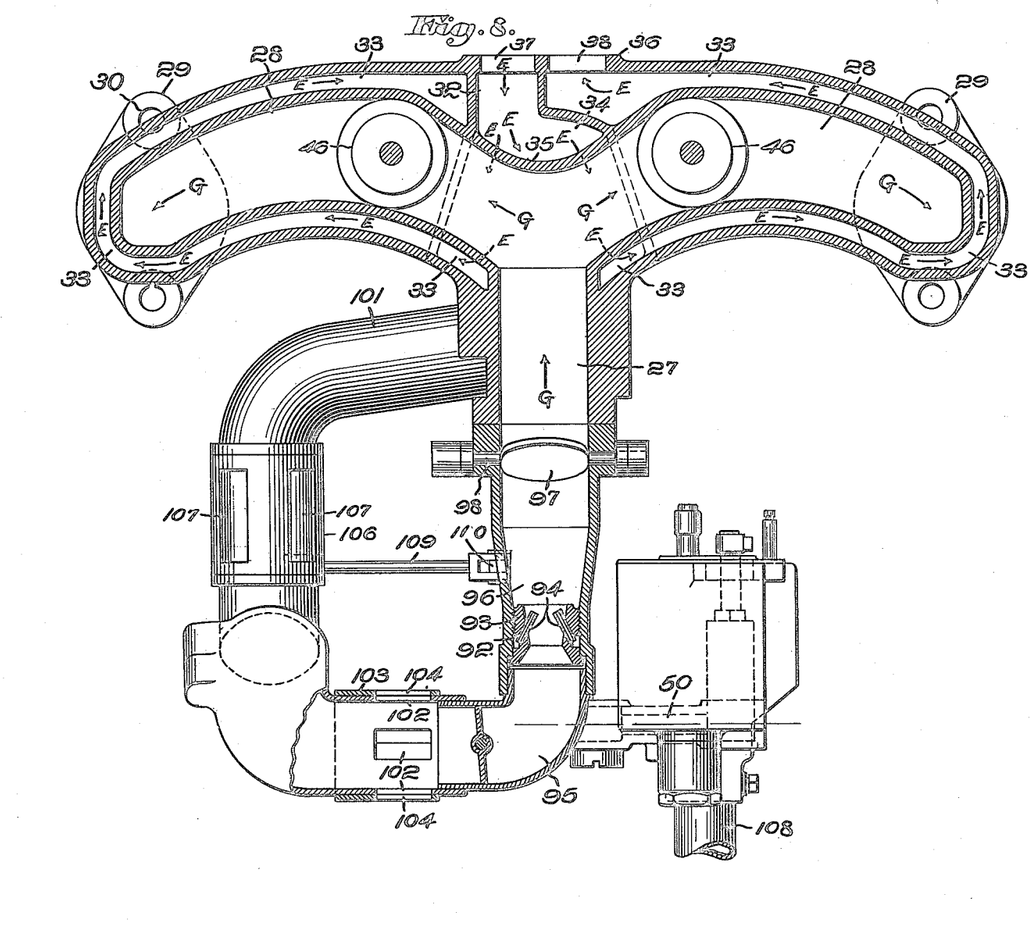

The thermostats 46 may be of any appropriate type, but in the present example, I have shown a common form of hollow, corrugated, accordion-like thermostat, which extends axially when heated, and contracts when cooled. I prefer to employ two thermostats 46, instead of one, in order to secure equal resistance in the two branches of the manifold. This arrangement is preferred to the placing of a single thermostat at the junction of the trunk and branches of the manifold, because at that point, the gases are not at their full heat. As a means for co-ordinating the action of the thermostats, and equalizing their effect, I have herein provided them with stems 70 connected to each other by a floating, equalizing lever 71, best shown in Figs. 3 and 4. This lever is pivoted at its ends to said stems, and at its central portion is connected by a link 72 to an arm 73, the latter in the present example being secured to the upper end of a vertical shaft 74, said shaft, as best shown in Fig. 5, being mounted in upper and lower bearings 75 and 76. To the lower end of this shaft is secured a preferably longer arm 77, which, as best shown in Figs. 9 and 11, is pivoted to one end of a link 78, the other end of said link being appropriately connected to the lever 66, which, it will be remembered, is secured to the valve stem 65.

I have herein provided means whereby the shifting of the valve from one position to the other is accomplished instantaneously, so that the change from one fuel to the other takes place quickly and without danger of the valve remaining in an intermediate position for some length of time, as would otherwise be the case. In the present instance, the link 78 is provided with a longitudinal slot 79, which receives a pin 80 carried by the lever 66, said slot providing a certain amount of lost motion between said link and said lever. The latter is herein provided with an offset terminal portion 81, which, as shown in Fig. 13, is above the plane of the link 78. This offset portion, as shown in Figs. 9 and 11, is provided with a slot 82 to receive a worm 83, the latter being mounted in one end of a short link 84, to the other end of which is secured a spring 85. The other end of this spring is loosely attached to a fixed pin 86.

Referring now to Fig. 14: As soon as the link 78 reaches the dotted line neutral position, wherein the centers of the roller 83, valve stem 65 and fixed pin 86, are substantially in a straight line, it must be evident that a very slight additional movement in the same direction will cause the tension of the spring 85 to move the roller 83 to the opposite end of the slot 82, thus throwing the lever 66 quickly to the other extreme of its travel into the position shown in full lines in Fig. 11. It is evident that when this takes place, the pin 80 carried by the lever 66 will travel to the opposite end of the slot 79, unimpeded by the link 78. When the thermostat cools and contracts, thus moving the link 78 in the reverse direction from the position shown in Fig. 11 toward the position shown in Fig. 9, a reversal of nication between the exhaust manifold 24 and the pipe 42, while the surrounding passage 106 provides a way of communication between the air inlet ports 100 and the pipe 101. By this means, the hot gases passing through the passage 105 into the pipe 42 leading to the intake manifold heat the incoming air in the surrounding passage 106 before such air passes through the pipe 101 to the intake of the carbureter. It should now be evident that I have provided a means for heating not only the air which is taken in to form the mixture, but the mixture itself after it leaves the carbureter and passes through the intake manifold into the engine.

After the exhaust gas has been utilized to heat the intake manifold, it is cooled to a considerable extent, and, if desired, it can then be led through the hereinbefore described pipe 43 to a point adjacent the heavier liquid fuel supply to raise the temperature of the latter to facilitate its carburation. To this end, I have herein provided the carbureter with a fuel heating chamber 107, best shown in Fig. 12, adjacent and preferably integral with the float chamber 49. Into this chamber the partially cooled exhaust gases are delivered by the pipe 43, and thus come in contact with a relatively small area of the wall of the fuel chamber 49, after which they are conducted from the chamber 107 by a pipe 108, which may lead to any suitable point. Thus it is evident that means for heating the liquid fuel, as well as the atmospheric air and combustible mixture, is provided, thereby ensuring the formation of a comparatively stable gas, which has no opportunity to condense, because it is heated up to a point where it enters the engine.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one embodiment of my invention, what I claim and desire by Letters Patent to secure is:

Claims:

1. In a fuel system for internal combustion engines, the combination of means for furnishing two fuel supplies, fuel controlling means having two fuel supplying positions, yielding means tending to move said controlling means from an intermediate position toward either of said fuel supplying positions, thermostatic means responsive to variations in the temperature of a part of the engine, and means connecting said thermostatic means to said fuel controlling means to cause the latter to move from either of said fuel supplying positions through said intermediate position toward the other fuel supplying position, said connecting means having a lost motion connection to permit said yielding means to move said fuel controlling means faster than said connecting means after said intermediate position has been passed.

2. The combination with an internal combustion engine having a fuel intake manifold provided with two branches, of fuel supplying means, fuel controlling means, two thermostats associated with said branches respectively, and means to equalize the effect of said thermostats and to cause them to actuate said fuel controlling means.

3. The combination with an internal combustion engine having a fuel intake manifold provided with two branches, of fuel supplying means, fuel controlling means, two thermostats associated with said branches respectively, and means including an equalizer connecting said thermostats to utilize their movement to actuate said fuel controlling means.

4. In a fuel system for internal combustion engines, the combination of means for furnishing a plurality of fuel supplies, and means for utilizing variations in the temperature of a part of said engine to shift from one fuel supply to another and to regulate the temperature of the combustible mixture while the engine is running on one of said fuel supplies.

5. In a fuel system for internal combustion engines, the combination of means for furnishing a plurality of fuel supplies, automatic means to shift from one fuel supply to another and to regulate the temperature of the combustible mixture while the engine is running on one of said fuel supplies, and manually operable means to regulate the temperature of the combustible mixture.

6. In a fuel system for internal combustion engines, the combination of means for furnishing a plurality of fuel supplies, automatic means to regulate the temperature of the combustible mixture while the engine is running on one of said fuel supplies, and manually operable means to regulate the temperature of the combustible mixture.

7. In a fuel system for internal combustion engines, the combination of means for furnishing a plurality of fuel supplies, thermostatic means to shift from one fuel supply to another and to regulate the temperature of the combustible mixture while the engine is running on one of said fuel supplies, and manually operable means to regulate the temperature of the combustible mixture.

8. In a fuel system for internal combus-